US009933856B2

(12) United States Patent
Zavesky

(10) Patent No.: US 9,933,856 B2
(45) Date of Patent: *Apr. 3, 2018

(54) CALIBRATING VISION SYSTEMS

(71) Applicant: AT&T Intellectual Property I, L.P., Atlanta, GA (US)

(72) Inventor: Eric Zavesky, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/293,346

(22) Filed: Oct. 14, 2016

(65) Prior Publication Data
US 2017/0031455 A1  Feb. 2, 2017

Related U.S. Application Data

(63) Continuation of application No. 14/499,096, filed on Sep. 27, 2014, now Pat. No. 9,483,690, which is a continuation of application No. 12/944,897, filed on Nov. 12, 2010, now Pat. No. 8,861,797.

(51) Int. Cl.
G06F 3/01 (2006.01)
G06K 9/00 (2006.01)
G06F 3/00 (2006.01)
G06T 7/80 (2017.01)

(52) U.S. Cl.
CPC .............. G06F 3/017 (2013.01); G06F 3/005 (2013.01); G06K 9/00355 (2013.01); G06K 9/00389 (2013.01); G06T 7/80 (2017.01)

(58) Field of Classification Search
CPC .......... G06K 9/00355; G06K 9/00362; G06K 9/00375; G06K 9/00389; G06F 3/017
See application file for complete search history.

(56) References Cited

U.S. PATENT DOCUMENTS

| 5,181,015 | A | 1/1993 | Marshall et al. ............. 340/706 |
| 7,483,057 | B2 | 1/2009 | Grosvenor et al. ......... 348/211.9 |
| 7,487,468 | B2 | 2/2009 | Tanaka et al. ................ 715/863 |
| 7,940,986 | B2 | 5/2011 | Mekenkamp et al. ........ 382/181 |
| 7,961,173 | B2 | 6/2011 | Boillot ......................... 345/158 |
| 8,199,108 | B2 | 6/2012 | Bell .............................. 345/158 |
| 8,552,983 | B2 | 10/2013 | Chiu ............................. 345/166 |
| 8,861,797 | B2 | 10/2014 | Zavesky ................. G06F 3/017 |
| 9,483,690 | B2 * | 11/2016 | Zavesky ............ G06K 9/00355 382/115 |
| 2001/0030668 | A1 | 10/2001 | Erten et al. ................... 345/863 |
| 2006/0044399 | A1 | 3/2006 | Fredlund et al. ........ 348/207.99 |

(Continued)

OTHER PUBLICATIONS

Kohler, M. (1996) "Vision based remote control in intelligent home environments," Proc. 3D Image Analysis and Synthesis 1996, pp. 147-154.

(Continued)

Primary Examiner — Andrew W Johns
(74) Attorney, Agent, or Firm — Scott P. Zimmerman, PLLC

(57) ABSTRACT

Methods, systems, and computer program calibrate a vision system. An image of a human gesture is received that frames a display device. A boundary defined by the human gesture is computed, and gesture area defined by the boundary is also computed. The gesture area is then mapped to pixels in the display device.

20 Claims, 12 Drawing Sheets

(56) References Cited

U.S. PATENT DOCUMENTS

| | | | |
|---|---|---|---|
| 2008/0028325 A1 | 1/2008 | Ferren et al. | 715/753 |
| 2008/0120577 A1 | 5/2008 | Ma et al. | 715/863 |
| 2009/0109795 A1 | 4/2009 | Marti | 367/118 |
| 2009/0262187 A1 | 10/2009 | Asada et al. | 348/77 |
| 2010/0013943 A1 | 1/2010 | Thorn | 348/222.1 |
| 2010/0103106 A1 | 4/2010 | Chui | 345/166 |
| 2010/0141578 A1 | 6/2010 | Horiuchi et al. | 345/158 |
| 2010/0199232 A1 | 8/2010 | Mistry et al. | 715/863 |
| 2010/0211920 A1 | 8/2010 | Westerman et al. | 715/863 |
| 2010/0231509 A1 | 9/2010 | Boillot et al. | 345/156 |
| 2011/0243380 A1 | 10/2011 | Forutanpour et al. | 382/103 |
| 2011/0267265 A1 | 11/2011 | Stinson | 345/157 |
| 2012/0223882 A1 | 9/2012 | Galor et al. | 345/157 |

OTHER PUBLICATIONS

Colombo et al. (Aug. 2003) "Visual capture and understanding of had pointing actions in a 3-d environment." IEEE Trans. On Systems, Man, and Cybernetics Part B, vol. 33 No. 4, pp. 677-686.
Jojic et al. (2000) "Detection and estimation of pointing gestures in dense disparity maps." Proc. 4th IEEE Int'l Conf on Automatic Face and Gesture Recognition, pp. 468-475.
Do et al. (2006) "Advanced soft remote control system using hand gesture." Proc. MICAI 2006, in LNAI vol. 4293, pp. 745-755.

* cited by examiner

CALIBRATING VISION SYSTEMS

CROSS-REFERENCE TO RELATED APPLICATIONS

This application is a continuation of U.S. application Ser. No. 14/499,096 filed Sep. 27, 2014 and since issued as U.S. Pat. No. 9,483,690, which is a continuation of U.S. application Ser. No. 12/944,897 filed Nov. 12, 2010 and since issued as U.S. Pat. No. 8,861,797, with both applications incorporated herein by reference in their entireties.

BACKGROUND

Exemplary embodiments generally relate to computer graphics processing, image analysis, and data processing and, more particularly, to display peripheral interface input devices, to tracking and detecting targets, to pattern recognition, and to gesture-based operator interfaces.

Computer-based vision systems are used to control computers, video games, military vehicles, and even medical equipment. Images captured by a camera are interpreted to perform some task. Conventional vision systems, however, require a cumbersome calibration process.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
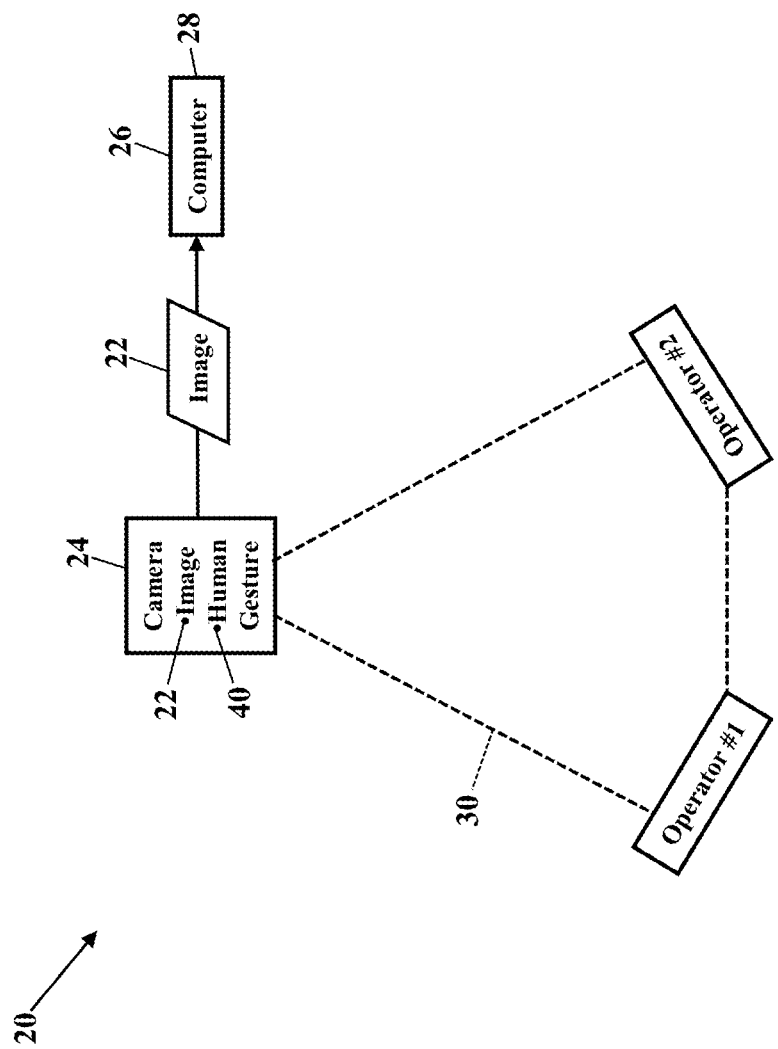
FIGS. 1 and 2 are simplified schematics illustrating an environment in which exemplary embodiments may be implemented.
Figure 2:
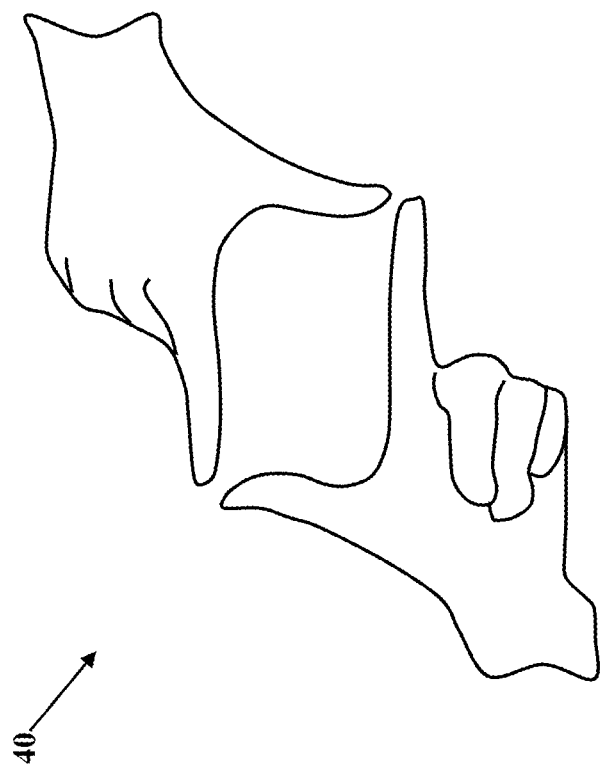

FIGS. 1 and 2 are simplified schematics illustrating an environment in which exemplary embodiments may be implemented. FIG. 1 illustrates a vision system 20 that captures one or more images 22 from a camera 24. An electronic device 26 (such as a computer 28) then extracts information from the images 22 to perform some task. Vision systems, for example, have been used to control computers, video games, military vehicles, and medical equipment. As vision systems continue to improve, even more complex tasks can be performed by analyzing data from the images 22.

Regardless of how the vision system 20 is used, a process called calibration may be required. The vision system 20 may need to acclimate itself to an operator and/or to an environment being monitored (e.g., a field of view 30 of the camera 24). These two pre-conditions are conventionally resolved by creating very rigid environments (e.g., a well-known, pre-calibrated field of view 30) or by requiring the operator to wear awkward clothing (e.g., gloves, hats, or materials created with specific reflective regions) for acceptable interaction.

Exemplary embodiments, however, calibrate using a human gesture 40. Exemplary embodiments propose a marker-less vision system 20 that uses the human gesture 40 to automatically calibrate for operator interaction. The human gesture 40 may be any gesture that is visually unique, thus permitting the vision system 20 to quickly identify the human gesture 40 within or inside a visually complex image 22. The vision system 20, for example, may be trained to calibrate using disjointed or unusual gestures, as later paragraphs will explain.

FIG. 2, for example, illustrates one such human gesture 40. Again, while any human gesture may be used, FIG. 2 illustrates the commonly known "framing of a picture" gesture formed by touching the index finger of one hand to the thumb of the opposite hand. This human gesture 40 has no strenuous dexterity requirements, and the human gesture 40 is visually unique within the image (illustrated as reference numeral 22 in FIG. 1). When the human operator performs the human gesture 40 to the camera (illustrated as reference numeral 24 in FIG. 1), the camera 24 captures the image 22 of the human gesture 40. The image 22 of the human gesture 40 may then be used to automatically calibrate the vision system 20.

Figure 3:
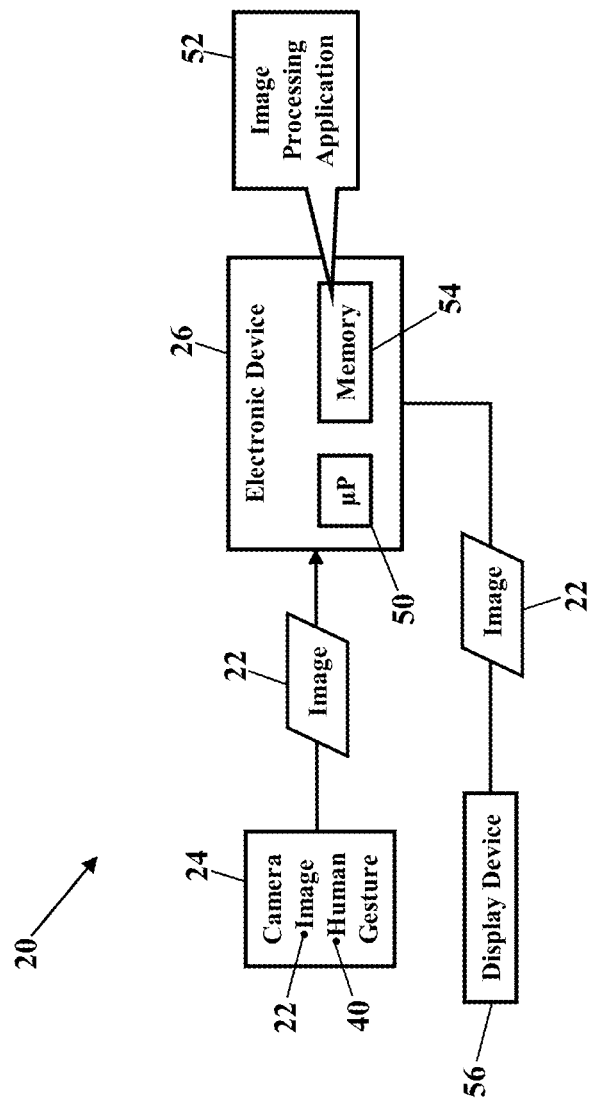
FIG. 3 is a more detailed schematic illustrating a vision system, according to exemplary embodiments.

FIG. 3 is a more detailed schematic illustrating the vision system 20, according to exemplary embodiments. FIG. 3 illustrates the camera 24 capturing the one or more images 22 of the human gesture 40. The images 22 are then sent or communicated to the electronic device 26 for processing. The electronic device 26 has a processor 50 (e.g., "μP"), application specific integrated circuit (ASIC), or other component that executes an image processing application 52 stored in memory 54. The image processing application 52 is a set of software commands or code that instruct the processor 50 to process the image 22 and to calibrate the vision system 20. The image processing application 52 may also cause the processor 50 to reproduce the image 22 on a display device 56.

Calibration correlates the operator's physical world with a computer-based world. Three of the most popular computer-based world examples are an augmented reality, an interactive world, and a virtual reality. The augmented reality world is where the operator sees graphics and text overlaid onto the image 22 of the real-world. In the interactive world, the electronic device 26 associates real-world actions with limited feedback from the virtual world. The virtual reality world immerses the operator in a wholly artificial, computer-based rendering that incorporates at least some information from the image 22. The human gesture 40 may be used to calibrate any of these computer-based world examples (the augmented reality, the interactive world, and the virtual reality). Conventionally, automatic calibration used an object with known geometry (e.g., a checker board or color bars) for calibration. This level of precision permits an exact association of the digitized image 22 with the computer's virtual world, but conventional methods require specialized props and experienced operators. Exemplary embodiments may eliminate both of these burdens by utilizing only the operator's hands and the human gesture 40 that is both intuitive and well-known (as FIG. 2 illustrated).

Figure 4:
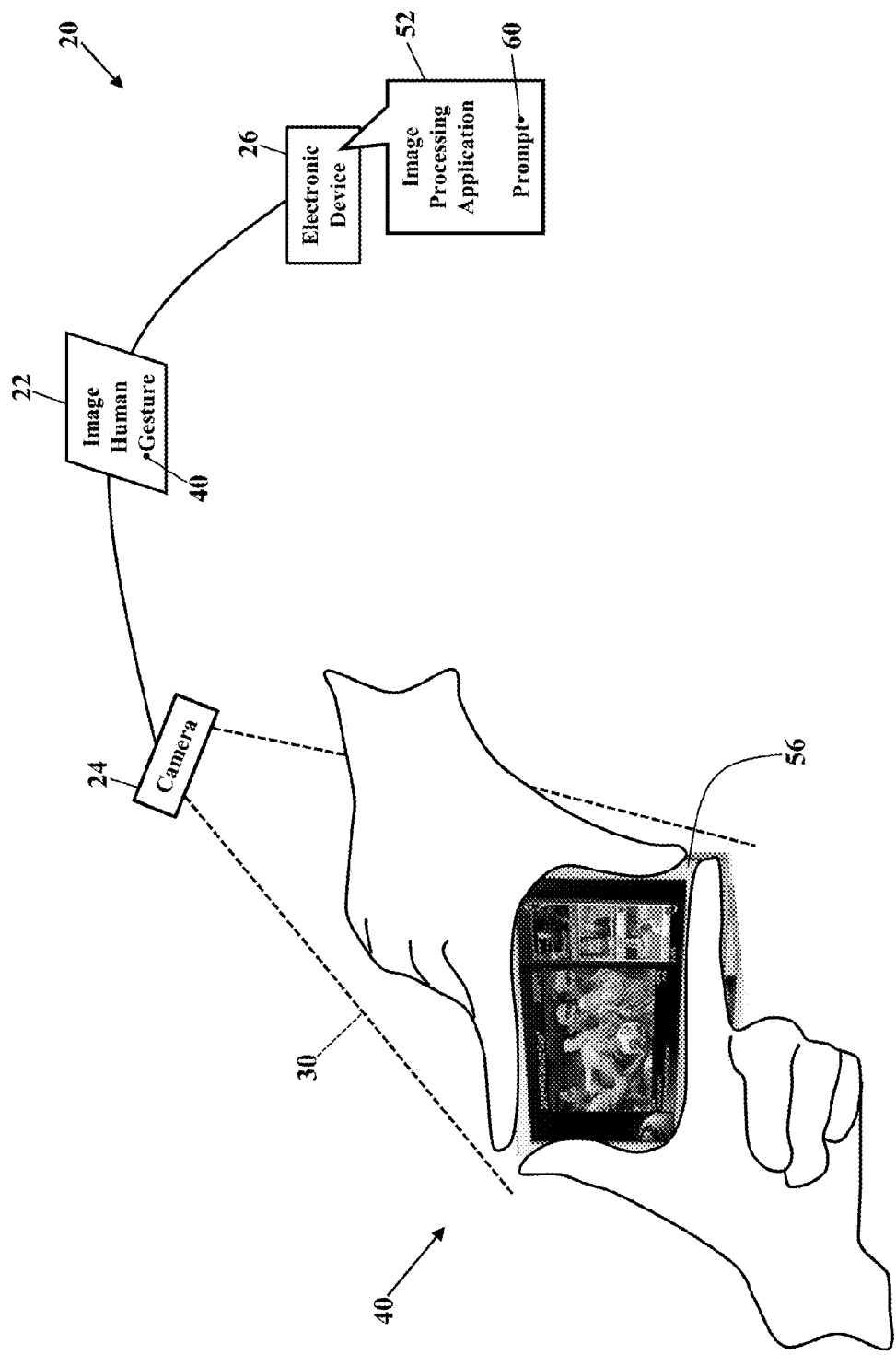
FIG. 4 is a schematic illustrating a human gesture, according to exemplary embodiments.

FIG. 4 is another schematic illustrating the human gesture 40, according to exemplary embodiments. When calibration is required, the image processing application 52 may cause the processor 50 to generate and display a prompt 60 for the human gesture 40. The operator then performs the human gesture 40 toward the camera 24. Here, though, the operator aligns the human gesture 40 to the display device 56. That is, the operator forms the human gesture 40 and centers the human gesture 40 to the display device 56. The display device 56 is thus framed within the human gesture 40 from the operator's perspective. Exemplary embodiments may thus achieve for a real-world (the user perspective) and virtual world (the extents of the display device 56) calibration in a simple but intuitive way.

Exemplary embodiments, however, need not prompt the operator. The operator, instead, may calibrate and begin interaction without the prompt 60. For example, if there is one person playing a game of tic-tac-toe on the display device 56, one or more players may join the game by simply posing the human gesture 40. Exemplary embodiments may also accommodate games and other applications that require authentication (e.g., a password or PIN code).

Figure 5:
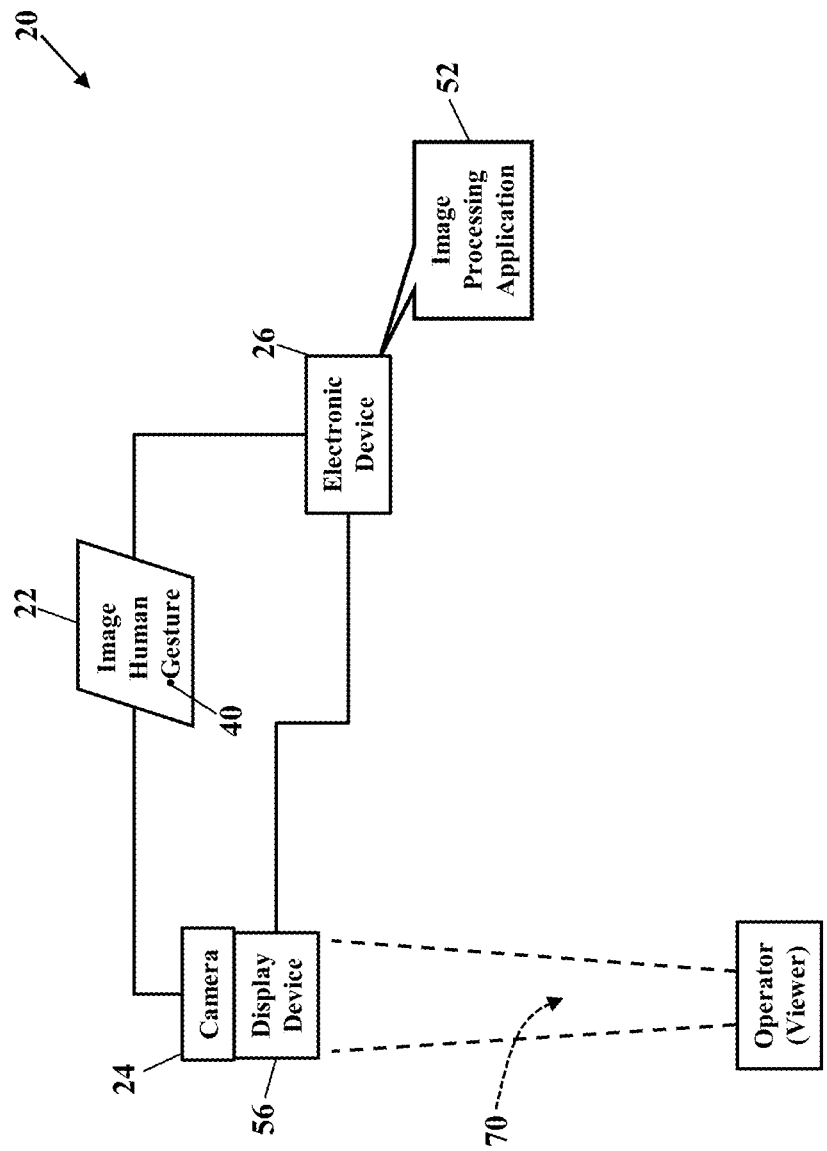
FIGS. 5 and 6 are schematics illustrating calibration using the human gesture, according to exemplary embodiments.
Figure 6:
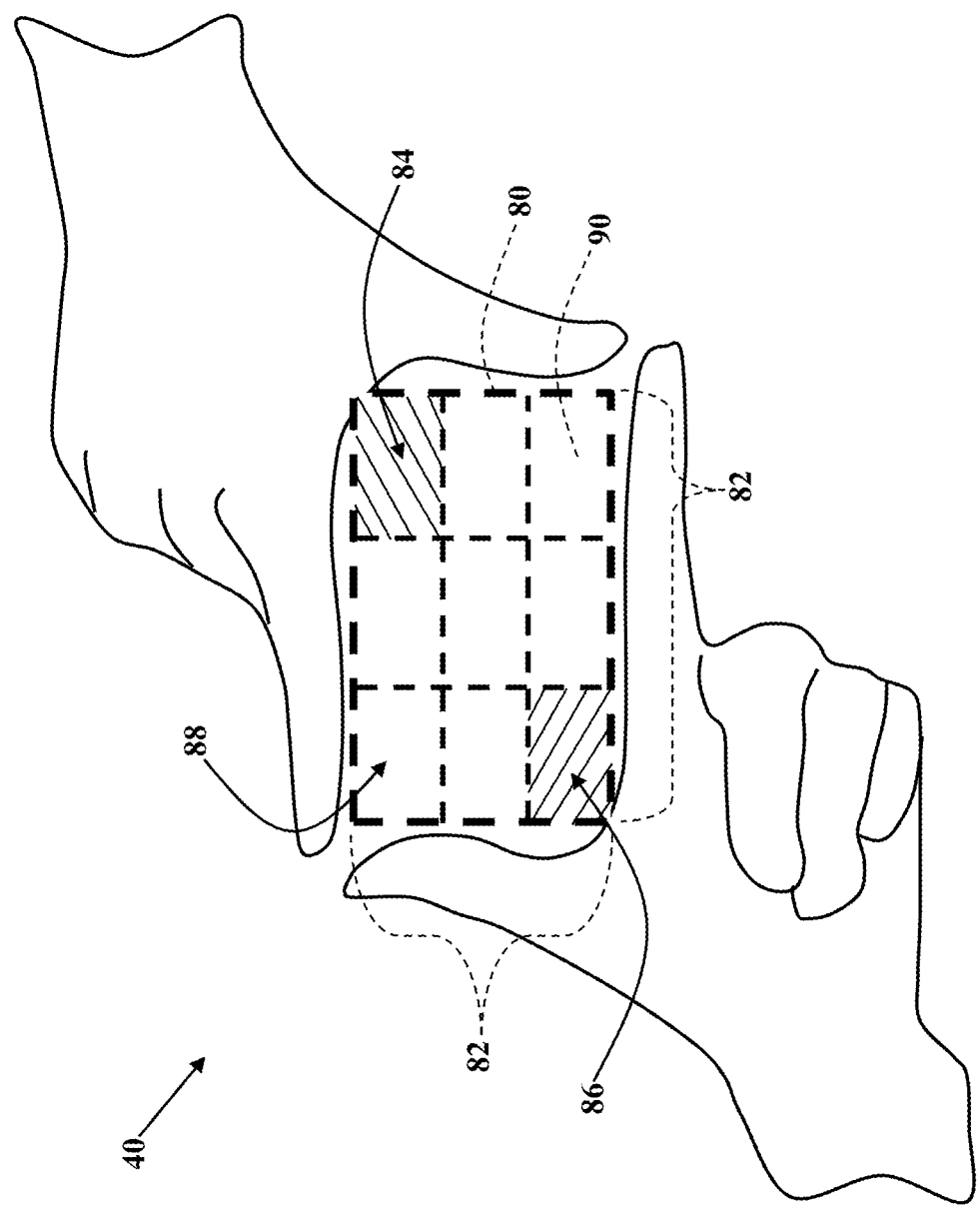

FIGS. 5 and 6 are schematics illustrating calibration using the human gesture 40, according to exemplary embodiments. FIG. 5 illustrates an interaction region 70 defined from the human gesture 40. When the operator forms the human gesture 40, and centers the human gesture 40 to the display device 56 (as FIG. 4 illustrated), the operator defines the interaction region 70. The interaction region 70 is thus a well-defined real-world region that the operator may use for gesture commands. Moreover, as FIG. 6 illustrates, the operator has also defined a finite (usually quite small) and well-known boundary 80 for interaction with the display device (illustrated as reference numeral 56 in FIG. 4). The operator's fingers and thumbs of the human gesture 40 define a rectangular region 82. A top right corner region (from the operator's perspective) is illustrated as reference numeral 84, while a bottom left corner region (also from the operator's perspective) is illustrated as reference numeral 86. The operator may thus easily imagine the horizontal and vertical extents of this gesture area 88, as the operator has calibrated the human gesture 40 to frame the display device 56. As the operator performs other gestures and interactions, exemplary embodiments need to only transform actions taken from the operator's real-world perspective (e.g., the bottom left corner region 86) to those of the virtual-world perspective (e.g., a bottom right corner region 90). Exemplary embodiments may thus perform a simple axis mirroring, because the camera 24 is observing the operator and not the display device 56 (as FIGS. 4 and 5 illustrate).

Figure 7:
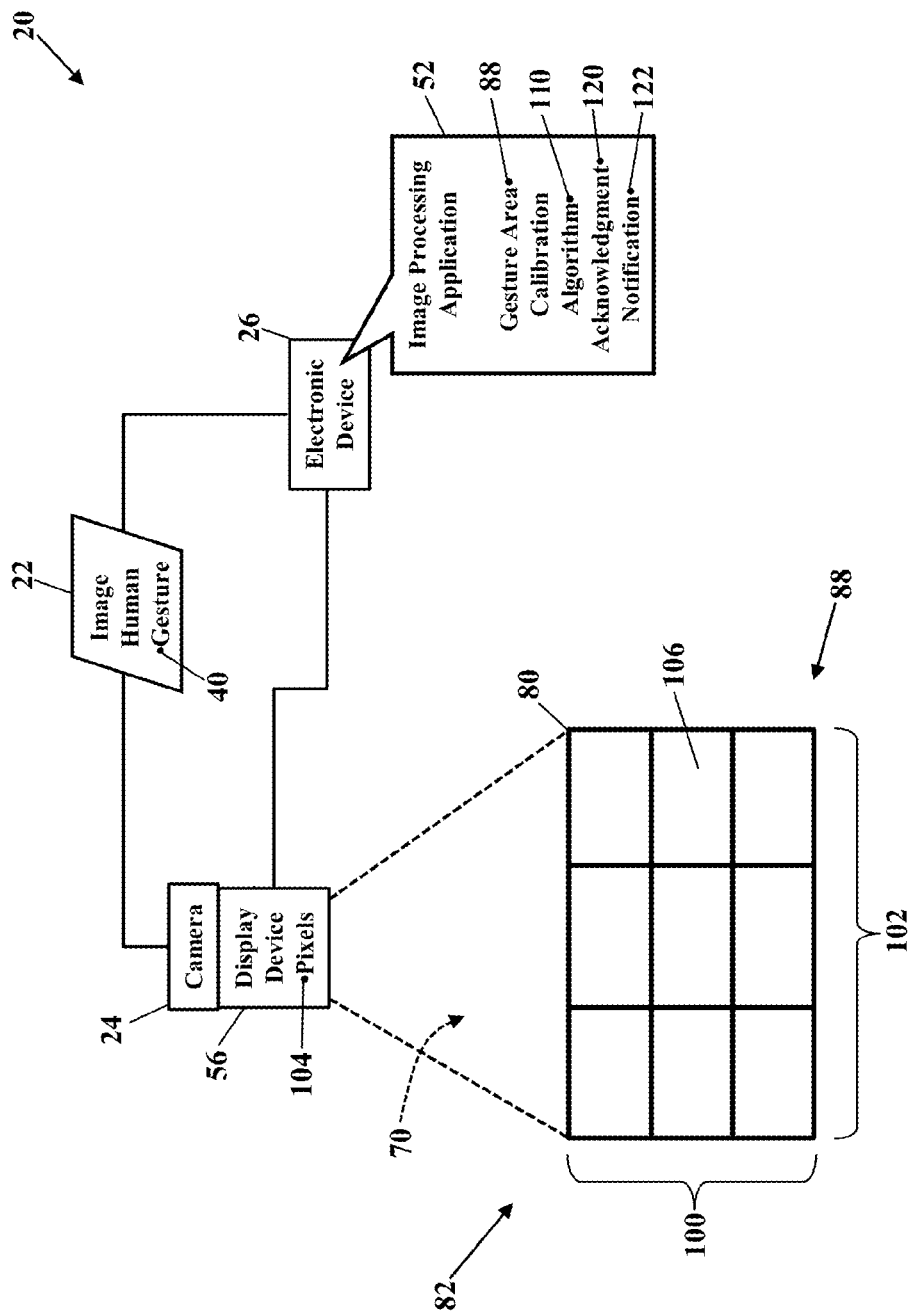
FIGS. 7 and 8 are schematics illustrating coordinate transformations, according to exemplary embodiments.
Figure 8:
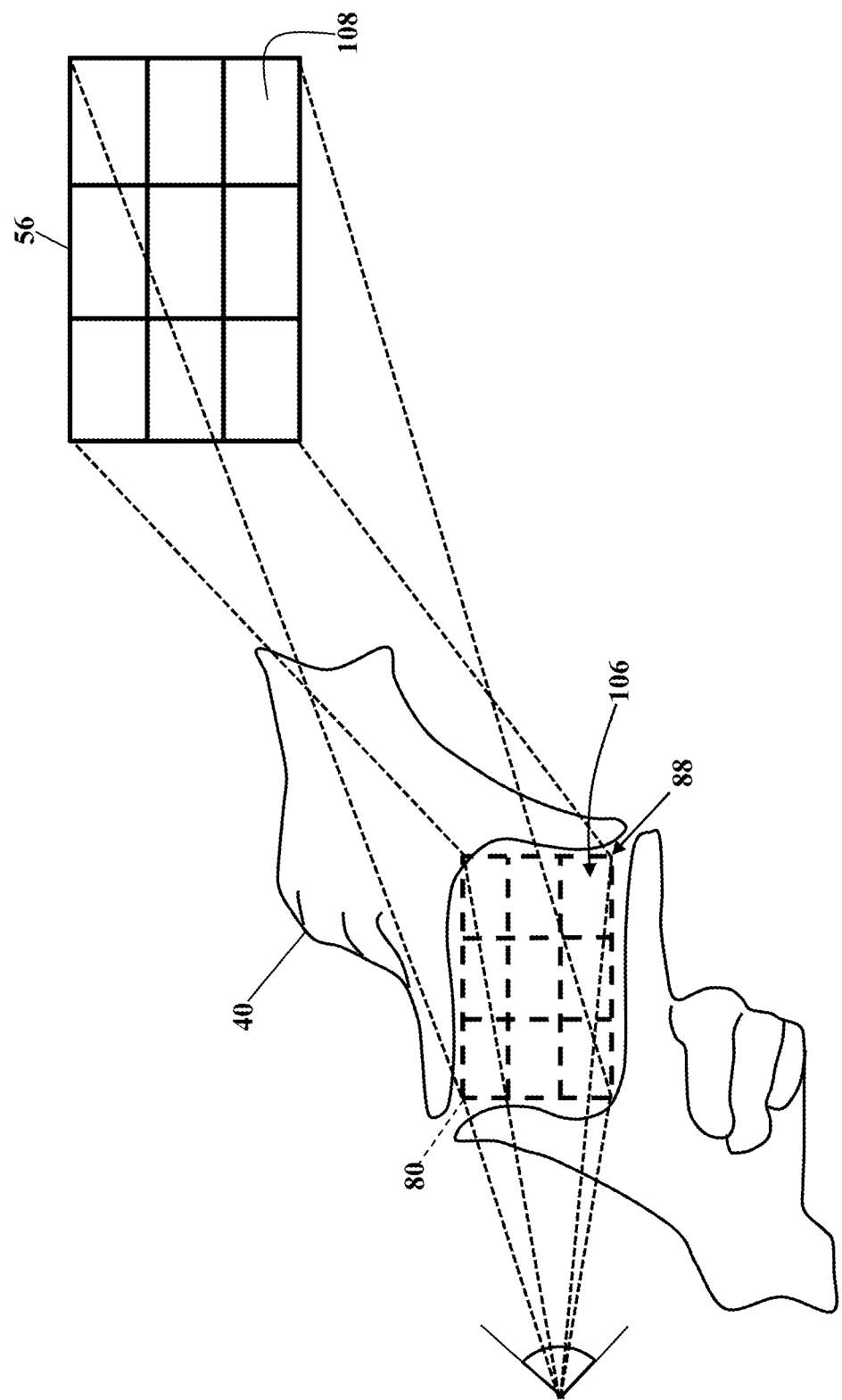

FIGS. 7 and 8 are schematics illustrating coordinate transformations, according to exemplary embodiments. Once the operator performs the human gesture 40, the image processing application 52 determines the boundary 80 defined by the operator's fingers and thumbs. As FIG. 7 illustrates, the boundary 80 has a height 100 and width 102 that defines the rectangular region 82. The image processing application 52 may compute a gesture area 88 (e.g., the height 100 multiplied by the width 102). The gesture area 88 may then be mapped to pixels 104 in the display device 56. Both FIGS. 7 and 8, for example, illustrate the gesture area 88 divided into nine (9) regions 106. The regions 106 may be more or less than nine, and the regions 106 may have equal or unequal areas. As FIG. 8 illustrates, each region 106, though, may be mapped to a corresponding region 108 of pixels in the display device 56. The total pixel resolution of the display device 56, in other words, may be equally sub-divided into nine (9) pixel regions, with each region 108 of pixels corresponding to a region 106 of the gesture area 88. Any operator interactions occurring within the gesture area 88 may thus be mapped to a corresponding region 108 of pixels within the display device 56.

Exemplary embodiments may utilize any calibration algorithm 110. Exemplary embodiments not only leverage existing algorithms for the detection of hand gestures as visual patterns, but exemplary embodiments may automatically calibrate real-world and virtual-world representations. As earlier paragraphs explained, the calibration algorithm 110 utilizes the intuitive human gesture 40 and the operator's perception of the display device 56 to automatically calibrate these two environments. Exemplary embodiments thus permit calibration in adverse conditions (e.g., low-lighting, unusual room geometry, untrained operators, etc.) because the operator is providing a highly precise identification of the display device 56 from his or her perspective. While there are no physical demarcations for the display device 56 once the operator lowers his or her hands, exemplary embodiments cognitively remember the boundary 80 of the gesture area 88. Exemplary embodiments map the gesture area 88 to the pixel boundaries of the display device 56 in the operator's line of sight. Once the human gesture 40 has been correctly detected, calibration of the real world and the virtual-world environments may be conceptually simple. The image processing application 52 need only to transform the coordinates of the camera's perspective into that of the operator to accurately detect the interaction region 70. Exemplary embodiments may thus perform planar and affine transformations for three-dimensional computer graphics, and the appropriate linear matrix multiplication is well known. As an added form of verification, exemplary embodiments may generate an acknowledgment 120 that calibration was successful or a notification 122 that calibration was unsuccessful.

Figure 9:
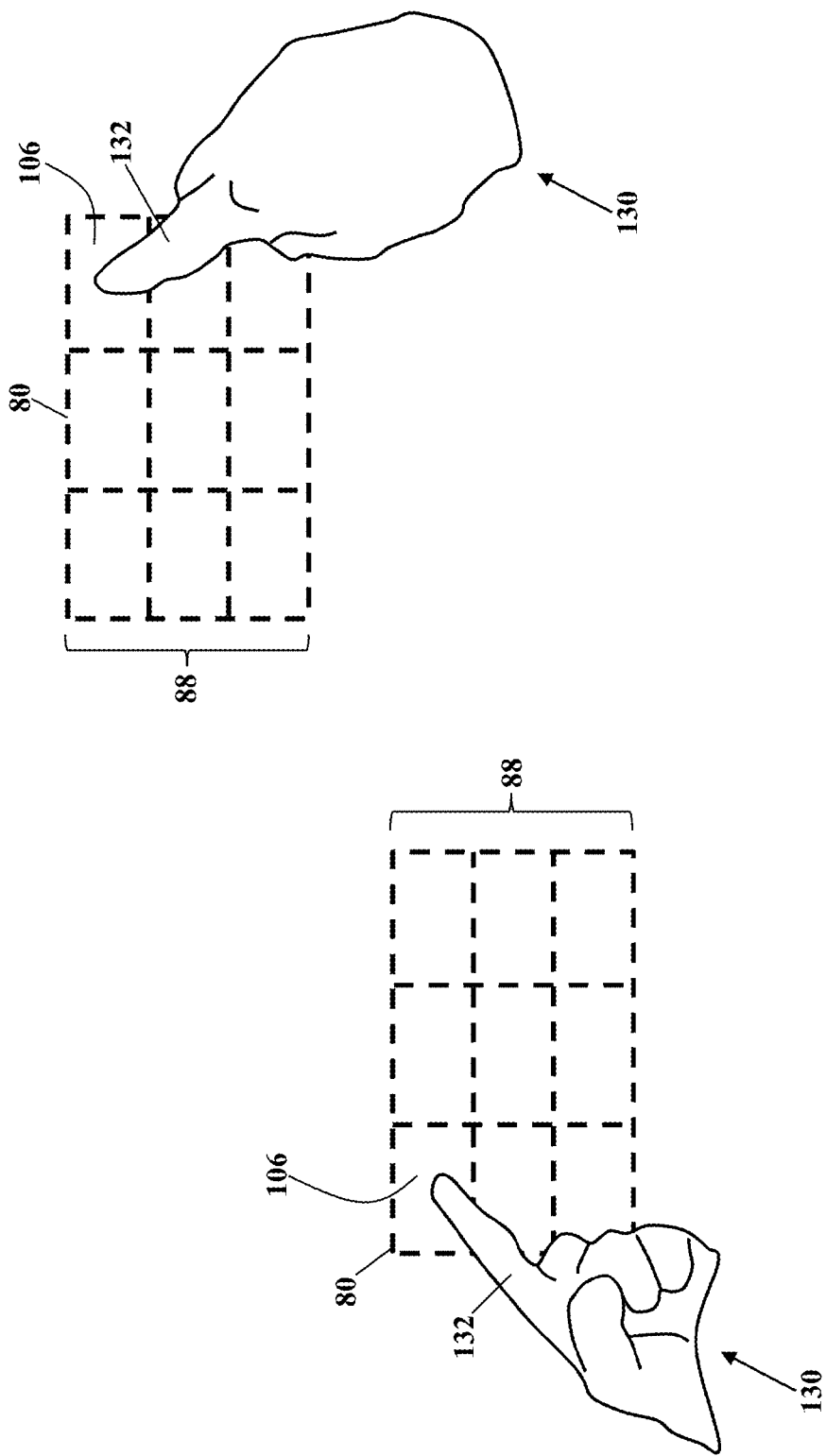
FIG. 9 is a schematic illustrating interaction gestures, according to exemplary embodiments.

FIG. 9 is a schematic illustrating interaction gestures, according to exemplary embodiments. Once the vision system is calibrated, the image processing application may thus recognize and interpret any other gesture command (the vision system and the image processing application are illustrated, respectively, as reference numerals 20 and 52 in FIGS. 3-5 & 7). FIG. 9, as an example, illustrates the common "pointing" gesture 130. When the operator performs this pointing gesture 130 within the gesture area 88, the image processing application 52 may thus recognize the region 106 of the gesture area 88 that is indicated by an index finger 132. The image processing application 52 may map the region 106 (indicated by the index finger 132) to the corresponding region of pixels (illustrated as reference numeral 108 in FIG. 8) within the display device 56. Because the vision system 20 has been calibrated to the gesture area 88, the operator's pointing gesture 130 may be interpreted to correspond to some associated command or task.

Exemplary embodiments may be utilized with any gesture. As human-computer interfaces move beyond physical interaction and voice commands, the inventor envisions a common lexicon of hand-based gestures will arise. Looking at modern touch-pads and mobile devices, a number of gestures are already present, such as clicks, swipes, multi-finger clicks or drags, and even some multi-component gestures (like finger dragging in an "L"-shape). With sufficient visual training data, exemplary embodiments may accommodate any gesture. For example:

swiping across the gesture area 88 with multiple fingers to turn a page or advance to the next object in a series;
extending a finger in a circular motion to shuttle forward or backward in the playback of a multimedia stream;
moving with the whole palm to pan in the viewing space;
closing a fist to cancel/or throw away some object;
moving a horizontally flattened hand up or down across the gesture area 88 to raise or lower volume, speed, etc.;
pinching a region of the gesture area 88 to zoom in or out on the display device 56; and
exposing the entire palm to cancel an action or illicit help from the vision system 20 (like raising a hand in a classroom).

Figure 10:
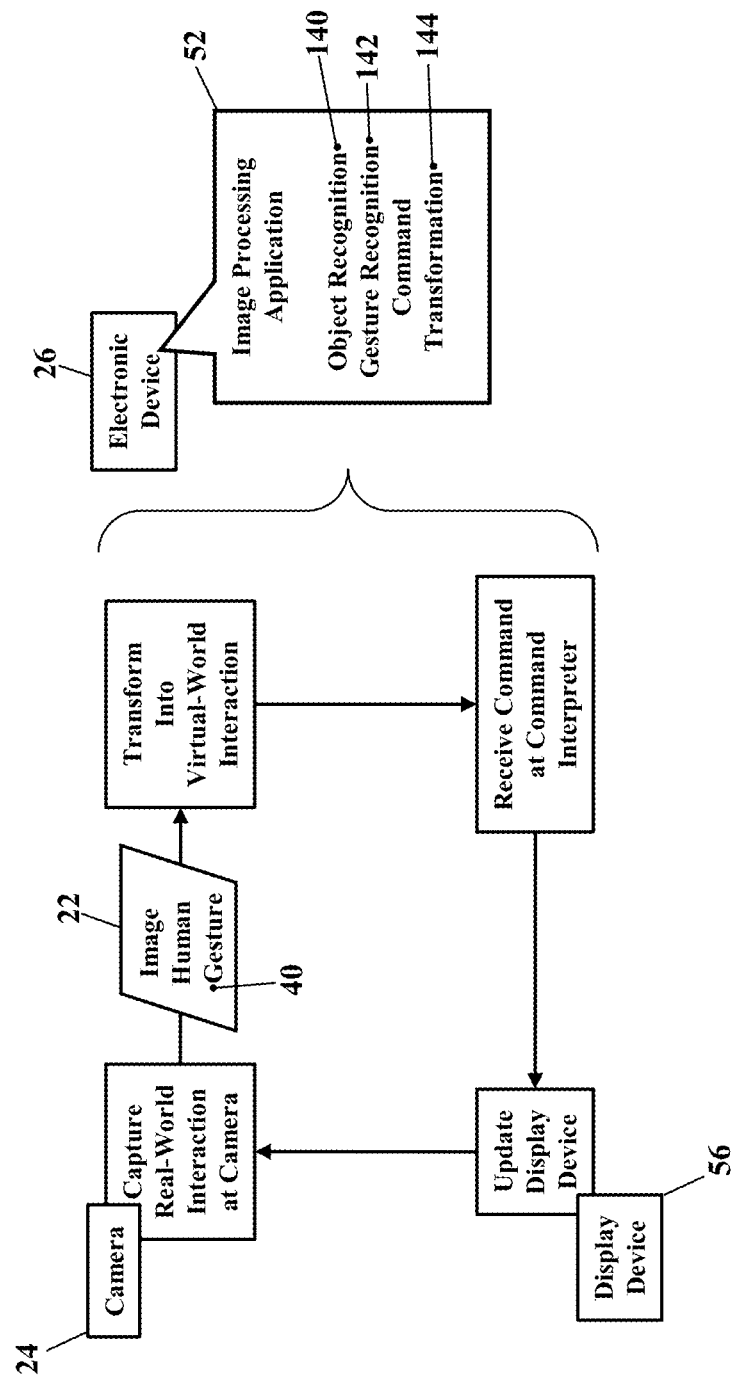
FIG. 10 is a process flow chart, according to exemplary embodiments.

FIG. 10 is a process flow chart, according to exemplary embodiments. The image processing application 52 may comprise algorithms, software subroutines, or software modules for object recognition 140, gesture recognition 142, and command transformation 144. Exemplary embodiments may execute a continuous logical loop, in which calibrated real-world interactions are captured by the camera 24. For any one operator, a constrained virtual-world region is utilized for object recognition 140. Once the operator's gesture interactions recognized, the operator's gesture interactions are mapped, localized, and transformed into virtual-world commands. Finally, these commands are delivered to a command interpreter (such as the display device 56) for execution (such as updating content generated on the display device 56).

Exemplary embodiments may utilize any algorithm. Any algorithm that detects visual patterns, visual templates, regions of high or low pixel intensity may be used. The commonly used boosted cascade of Haar wavelet classifiers, for example, may be used, as described by Paul Viola & Michael J. Jones, *Robust Real-Time Face Detection*, 57 International Journal of Computer Vision 137-154 (2004). Exemplary embodiments, however, do not depend on a specific image resolution, even though high-resolution images and complex gestures may place a heavier demand on the processor 50 and memory 54. During the object recognition 140, the image processing application 52 has knowledge of where (within the real-world spatial location) the human gesture 40 or visual object is in the image 22 provided by the camera 24. If only one input from the camera 24 is provided, spatial knowledge may be limited to a single two-dimensional plane. More specifically, without additional computation (and calibration), exemplary embodiments may have little or no knowledge about the distance of the operator from the camera 24 in the interaction area (illustrated as reference numeral 70 in FIG. 5). However, to better facilitate entertainment uses (i.e., interactive games or three-dimensional video chats), the combination of two or more cameras 24 may resolve these visual disparities and correctly identify the three-dimensional real-world location of the operator and his or her gestures.

A secondary problem that some vision systems encounter is the need to recalibrate if the operator moves around the environment. Exemplary embodiments, however, even though originally envisioned for television viewing and entertainment purposes, were designed with this potential pitfall in mind. Exemplary embodiments thus include an elegant solution to accommodate operator mobility within the entire viewing area of the camera 24. During calibration, the operator performs the human gesture 40 to spatially identify the display device 56 according to his or her perspective. However, at the same time, the operator is also specifically identifying her face to the camera 24. Exemplary embodiments may thus perform a second detection for the operator's face and reuse that region for face recognition in subsequent use. Using the relative size and position of the operator's face, exemplary embodiments may accommodate small movements in the same viewing area without requiring additional calibration sessions. For additional performance improvement, additional detection and tracking techniques may be applied to follow the operator's entire body (i.e., his or her gait) while moving around the viewing area.

Exemplary embodiments may utilize any display device 56 having any resolution. Exemplary embodiments also do not depend on the content being generated by the display device 56. The operator is implicitly resolving confusion about the size and location of the display device 56 when he or she calibrates the vision system 20. Therefore, the content being displayed on the display device 56 may be relatively static (a menu with several buttons to "click"), quite dynamic (a video game that has movement and several interaction areas on screen), or a hybrid of these examples. Exemplary embodiments, at a minimum, need only translate the operator's interactions into digital interaction commands, so these interactions may be a mouse movement, a button click, a multi-finger swipe, etc. Exemplary embodiments need only be trained with the correct interaction gesture.

Exemplary embodiments may also include automatic enrollment. Beyond automatic calibration itself, exemplary embodiments may also track and adjust internal detection and recognition algorithms or identify potential errors for a specific operator. Conventional vision systems, typically trained to perform detection of visual objects, either have a limited tolerance for variation in those objects (i.e., the size of fingers or face geometry is relatively fixed) or they require additional real-time calibration to handle operator specific traits (often referred to as an "enrollment" process). Even though exemplary embodiments may utilize enrollment, the operator is already identifying his or her hands, face, and some form of body geometry to the vision system 20 during automatic calibration (by performing the human gesture 40). Exemplary embodiments may thus undertake any necessary adjustments, according to an operator's traits, at the time of the human gesture 40. Again, to reassure the operator, immediate audible or visual feedback may be provided. For example, when the vision system 20 observes an operator making the "picture frame" human gesture 40, exemplary embodiments may automatically compute the thickness of fingers, the span of the operator's hand, perform face detection, perform body detection (for gait-based tracking), and begin to extract low-level image features for recognition from the video segment used for calibration. Traditional vision systems that lack a form of automatic enrollment must explicitly request that an operator identify himself or herself to begin low-level feature extraction.

Exemplary embodiments may also detect and recognize different gestures as the operator moves within the viewing area. Automatic enrollment allows the vision system 20 to immediately identify errors due to out-of-tolerance conditions (like the operator being too far from the camera 24, the operator's gesture was ill formed, or the lighting conditions may be too poor for recognition of all gestures). With immediate identification of these potential errors, before any interaction begins, the operator is alerted and prompted to retry the calibration or adjust their location, allowing an uninterrupted operator experience and reducing frustration that may be caused by failures in the interaction that traditional vision systems could not predict.

Exemplary embodiments may also provide marker-less interaction. Conventional vision systems may require that the operator wear special clothing or use required physical props to interact with the vision system 20. Exemplary embodiments, however, utilize a pre-defined real-world space (e.g., the interaction area 70 and/or the gesture area 88) that the user has chosen that can easily be transformed into virtual-world coordinates once calibrated. Once this real-world space is defined by the operator's hands, it is very easy for that operator to cognitively remember and interact within the real-world space. Thus, any interactive gesture, whether it is a simple pointing action to click or a swiping action to navigate between display "pages," can be performed by the operator within the calibrated, real-world space with little or no effort.

Exemplary embodiments may also provide simultaneous calibration for multiple participants. Another inherent drawback of traditional vision systems that use physical remote controls, props, or "hot spot" areas for interaction is that these conventional systems only accommodate operators that have the special equipment. For example, a popular gaming console now uses wireless remotes and infrared cameras to allow multiple operators to interact with the game. However, if only two remotes are available, it may be impossible for a third operator to use the game. Because exemplary embodiments utilize the human gesture 40 for calibration, the number of simultaneous operators is limited only by processing power (e.g., the processor 50, memory 54, and the image processing application 52). As long as no operators/players occlude each other from the camera's perspective, exemplary embodiments have no limit to the number of operators that may simultaneously interact with the vision system 20. Even if operator occlusion should occur, multiple cameras may be used (as later paragraphs will explain). Exemplary embodiments may thus be quickly scaled to a large number of operators, thus opening up any software application to a more "social" environment, such as interactive voting for a game show (each operator could gesture a thumbs-up or thumbs-down movement), collaborative puzzle solving (each operator could work on a different part of the display device 56), or more traditional collaborative sports games (tennis, ping-pong, etc.).

Exemplary embodiments may also provide remote collaboration and teleconferencing. Because exemplary embodiments may be scaled to any number of operators, exemplary embodiments may include remote collaboration. Contrary to existing teleconferencing solutions, exemplary embodiments do not require a physical or virtual whiteboard, device, or other static object to provide operator interaction. Therefore, once an interaction by one operator is recognized, exemplary embodiments may digitally broadcast the operator's interaction to multiple display devices (via their respective command interpreters) to modify remote displays. Remote calibration thus complements the ability to automatically track operators and to instantly add an unlimited number of operators.

As earlier paragraphs mentioned, exemplary embodiments may utilize any gesture. FIGS. 2, 4, 6, and 8 illustrate the commonly known "framing of a picture" gesture to automatically calibrate the vision system 20. Exemplary embodiments, however, may utilize any other human gesture 40 that is recognized within the image 22. The vision system 20, for example, may be trained to calibrate using a "flattened palm" or "stop" gesture. An outstretched, face-out palm gesture presents a solid surface with established boundaries (e.g., the boundary 80, the rectangular region 82, and the gesture area 88 illustrated in FIG. 6). The vision system 20, however, may also be trained to recognize and calibrate using more disjointed or even unusual gestures. The vision system 20, for example, may be trained to recognize a "thumbs up" or "okay" gesture. Both the "thumbs up" and "okay" gestures establish the gesture area 88. The vision system 20 may be taught that the gesture area 88 is twice a width and twice a height of the "thumbs up" gesture, for example.

Figure 11:
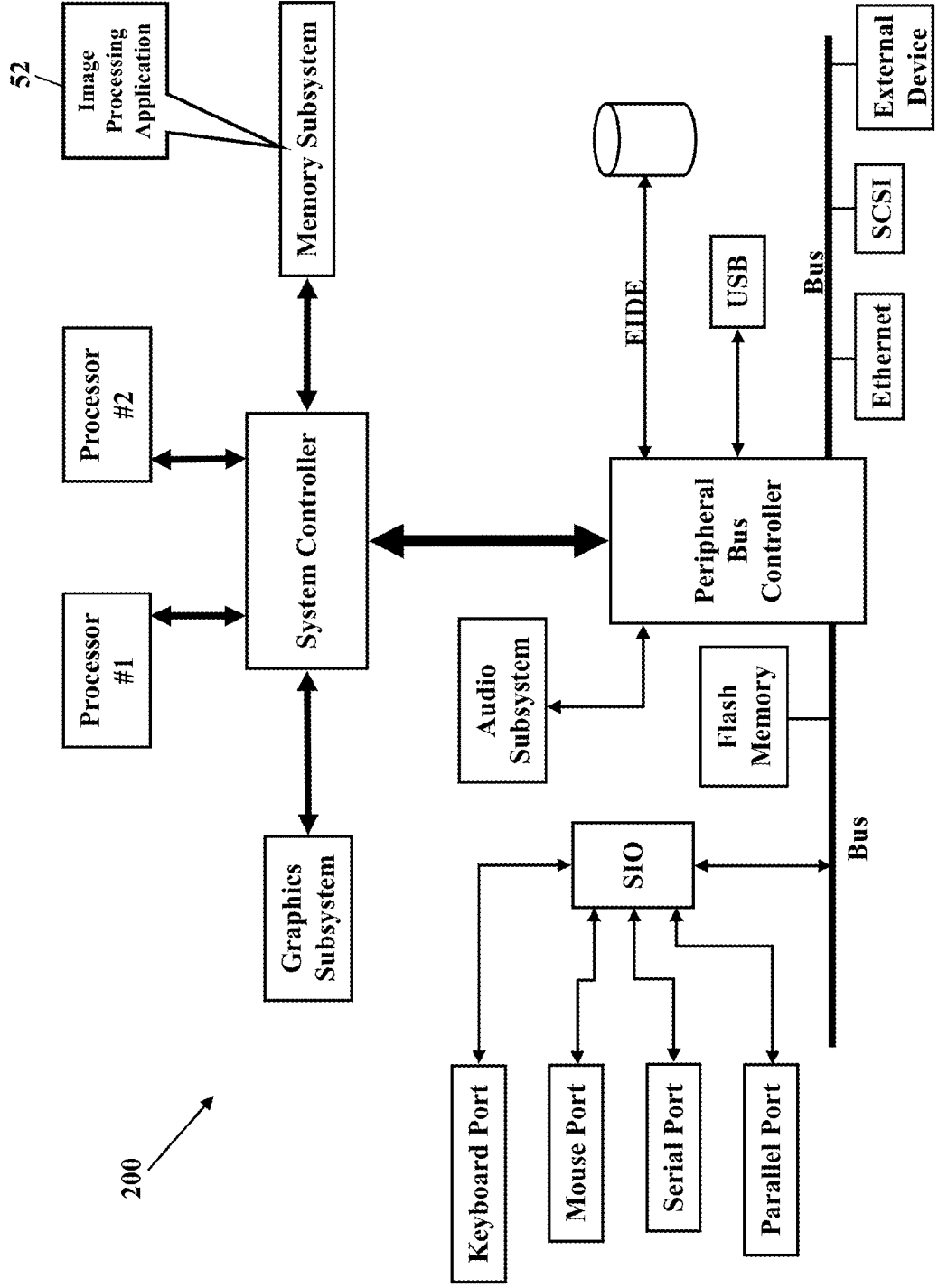
FIG. 11 is a generic block diagram of a processor-controlled device, according to exemplary embodiments.

FIG. 11 is a schematic illustrating still more exemplary embodiments. FIG. 11 is a generic block diagram illustrating the image processing application 52 operating within a processor-controlled device 200. As the above paragraphs explained, the image processing application 52 may operate in any processor-controlled device 200. FIG. 11, then, illustrates the image processing application 52 stored in a memory subsystem of the processor-controlled device 200. One or more processors communicate with the memory subsystem and execute either application. Because the processor-controlled device 200 illustrated in FIG. 11 is well-known to those of ordinary skill in the art, no detailed explanation is needed.

Figure 12:
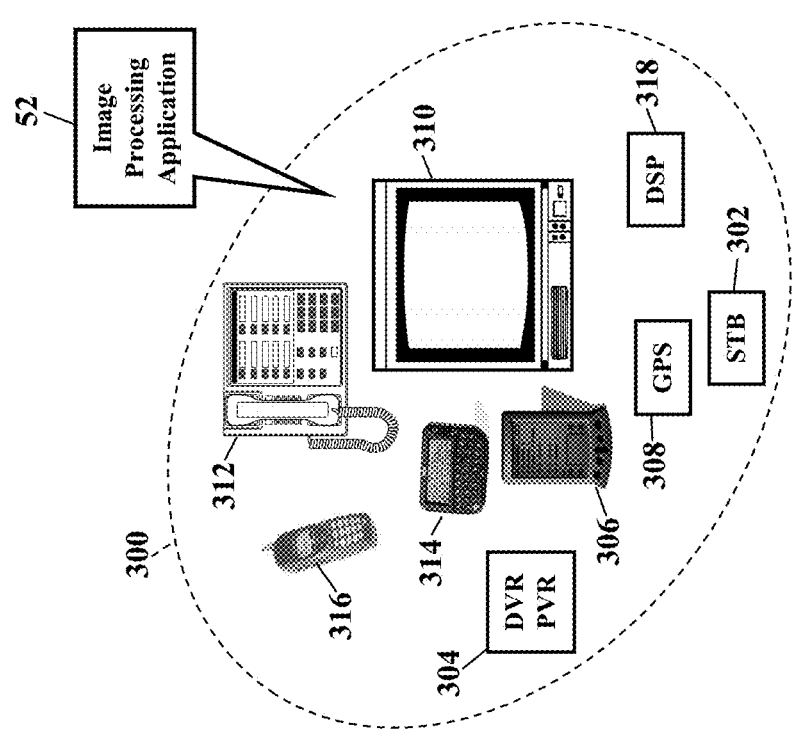
FIG. 12 depicts other possible operating environments for additional aspects of the exemplary embodiments.

FIG. 12 depicts other possible operating environments for additional aspects of the exemplary embodiments. FIG. 12 illustrates image processing application 52 operating within various other devices 300. FIG. 12, for example, illustrates that either application may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or processor-controlled device utilizing a digital signal processor (DP/DSP) 318. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for calibrating, interpreting, and commanding vision systems, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
    capturing, by a vision system, a digital image of a human performing a gesture;
    determining, by the vision system, a gesture interaction region based on the digital image of the human performing the gesture; and
    interpreting, by the vision system, other images of other gestures performed within the gesture interaction region.

2. The method of claim 1, further comprising mapping the gesture interaction region to pixels in a display device.

3. The method of claim 1, further comprising regionalizing the gesture interaction region into different regions.

4. The method of claim 1, further comprising determining a boundary associated with the gesture interaction region.

5. The method of claim 1, further comprising interpreting the gesture captured in the digital image.

6. The method of claim 1, further comprising recognizing a face of the human within the digital image.

7. The method of claim 1, further comprising recognizing a face of the human within the gesture interaction region.

8. A system, comprising:
    a hardware processor; and
    a memory device, the memory device storing code, the code when executed causing the hardware processor to perform operations, the operations comprising:
    capturing a digital image of a human performing a gesture;
    determining a gesture interaction region based on the digital image of the human performing the gesture; and
    interpreting other images of other gestures also performed within the gesture interaction region.

9. The system of claim 8, wherein the operations further comprise mapping the gesture interaction region to pixels in a display device.

10. The system of claim 8, wherein the operations further comprise regionalizing the gesture interaction region into different regions.

11. The system of claim 8, wherein the operations further comprise determining a boundary associated with the gesture interaction region.

12. The system of claim 8, wherein the operations further comprise interpreting the gesture captured in the digital image.

13. The system of claim 8, wherein the operations further comprise recognizing a face of the human within the digital image.

14. The system of claim 8, wherein the operations further comprise recognizing a face of the human within the gesture interaction region.

15. A memory device storing code which when executed causes a hardware processor to perform operations, the operations comprising:
    capturing a digital image of a human performing a gesture to interact with a vision system;
    recognizing a face of the human within the digital image;
    determining a gesture interaction region based on the digital image of the human performing the gesture; and
    interpreting other images of other gestures also performed within the gesture interaction region by the human recognized by the face.

16. The memory device of claim 15, wherein the operations further comprise mapping the gesture interaction region to pixels in a display device.

17. The memory device of claim 15, wherein the operations further comprise regionalizing the gesture interaction region into different regions.

18. The memory device of claim 15, wherein the operations further comprise determining a boundary associated with the gesture interaction region.

19. The memory device of claim 15, wherein the operations further comprise interpreting the gesture captured in the digital image.

20. The memory device of claim 15, wherein the operations further comprise determining a facial region associated with the face of the human recognized within the gesture interaction region.

* * * * *